United States Patent
Ory

(10) Patent No.: US 8,500,158 B2
(45) Date of Patent: Aug. 6, 2013

(54) HINGE ARRANGEMENT FOR AIRBAG FLAP HINGED ON A DASHBOARD

(75) Inventor: Daniel Ory, Le-Plessis-Bouchard (FR)

(73) Assignee: Faurecia Interieur Industrie, Nanterre (FR)

( * ) Notice: Subject to any disclaimer, the term of this patent is extended or adjusted under 35 U.S.C. 154(b) by 0 days.

(21) Appl. No.: 13/145,529

(22) PCT Filed: Jan. 20, 2010

(86) PCT No.: PCT/EP2010/050617
§ 371 (c)(1),
(2), (4) Date: Sep. 24, 2011

(87) PCT Pub. No.: WO2010/084125
PCT Pub. Date: Jul. 29, 2010

(65) Prior Publication Data
US 2012/0032467 A1  Feb. 9, 2012

(30) Foreign Application Priority Data

Jan. 21, 2009 (FR) ..................................... 09 00253

(51) Int. Cl.
*B60R 21/216* (2011.01)
(52) U.S. Cl.
USPC ...................... 280/728.3; 280/743.2
(58) Field of Classification Search
USPC ........................... 280/728.3, 743.2
See application file for complete search history.

(56) References Cited

U.S. PATENT DOCUMENTS

| | | | | | |
|---|---|---|---|---|---|
| 5,472,228 | A | * | 12/1995 | Bentley et al. | 280/728.3 |
| 5,902,428 | A | * | 5/1999 | Gallagher et al. | 156/73.1 |
| 5,941,558 | A | * | 8/1999 | Labrie et al. | 280/728.3 |
| 5,975,563 | A | * | 11/1999 | Gallagher et al. | 280/728.3 |
| 2005/0127642 | A1 | | 6/2005 | Weissert | |
| 2007/0080521 | A1 | * | 4/2007 | Leserre et al. | 280/728.3 |
| 2011/0181028 | A1 | * | 7/2011 | Brunet | 280/728.3 |
| 2011/0278827 | A1 | * | 11/2011 | Laboeck et al. | 280/743.2 |

FOREIGN PATENT DOCUMENTS

| | | |
|---|---|---|
| DE | 102007055016 | 11/2008 |
| EP | 0976622 | 2/2000 |
| EP | 1759935 | 3/2007 |

OTHER PUBLICATIONS

International Search Report for PCT/EP2010/050617 dated Feb. 23, 2010, 3 pages.

* cited by examiner

*Primary Examiner* — Drew Brown
(74) *Attorney, Agent, or Firm* — Reising Ethington P.C.

(57) ABSTRACT

The invention relates to a hinge arrangement for an airbag flap hinged to a dashboard. The motor vehicle dashboard body (1) is provided with an opening closed by a flap (4), both the opening and the flap being defined by an outline (3) that is generally rectangular, the flap being suitable for opening so as to allow an airbag to be deployed. It is further provided with one or more linear ties (11-14) fastened to one face of the dashboard body and to one face of the flap, in such manner that segments (43, 44) of linear ties straddle a portion (6) of the outline that extends transversely relative to the vehicle on which the dashboard is to be mounted, in order to constitute or reinforce a hinge (AX) via which the flap is hinged to the dashboard body. The invention relates to motor vehicle safety.

15 Claims, 2 Drawing Sheets

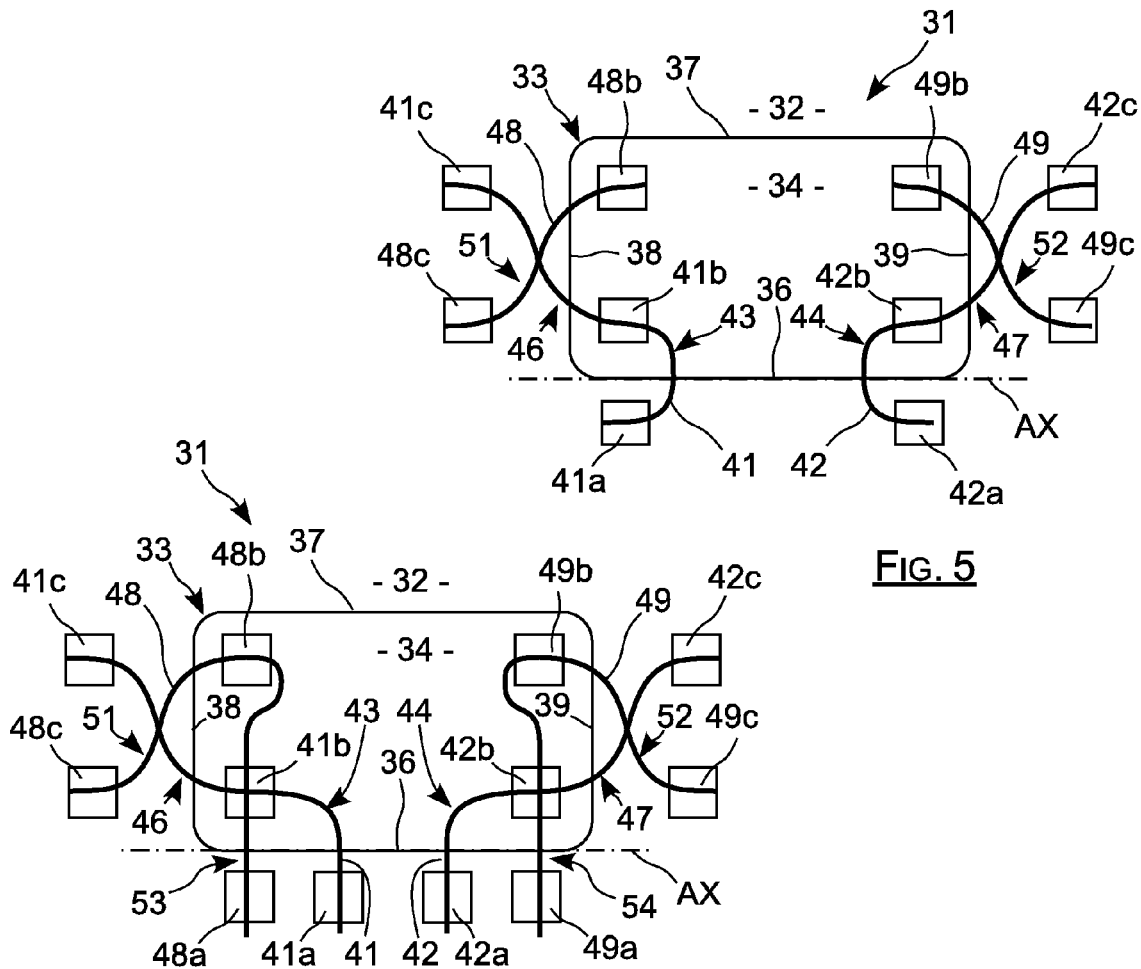
FIG. 5
FIG. 6
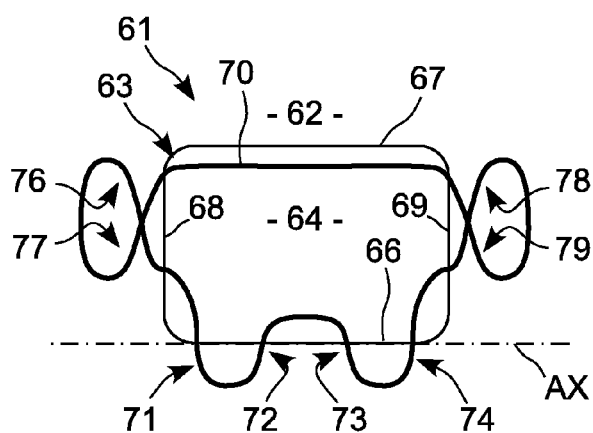
FIG. 7
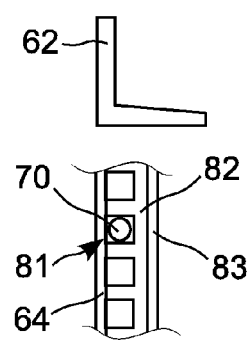
FIG. 8

HINGE ARRANGEMENT FOR AIRBAG FLAP HINGED ON A DASHBOARD

The invention relates to mounting a flap equipping an opening in a dashboard body of a motor vehicle, which flap masks an airbag carried at the back face of said dashboard.

BACKGROUND OF THE INVENTION

In such an arrangement, the dashboard, which is situated inside the vehicle and below the windshield, comprises a dashboard body that has a back face carrying an airbag module, which module comprises an enclosure containing the airbag and inflation means for inflating said airbag, and facing the corresponding opening in the dashboard body.

The opening, which is generally rectangular, is closed by one or two flaps, each of which has an edge that is hinged to a corresponding transverse edge of said opening. A firing channel, forming a spacer, is interposed between the airbag module and the back face of the dashboard body.

The front face of each flap and the front face of the dashboard body constitute a substantially continuous convex surface. Said convex surface may be covered by a skin, in order to make the flap substantially invisible to an occupant of the vehicle.

When an impact is detected, the airbag inflates automatically, so that it exerts pressure on the inside face of the flap, thereby causing it to open, against the covering that tears. That enables the airbag to be deployed through the dashboard towards the inside of the vehicle, in such a manner as to be interposed between an occupant of the vehicle and the dashboard.

The flap opens and the airbag is fully inflated within a lapse of time that must be sufficiently short to protect the occupant of the vehicle by preventing the occupant's head from hitting the dashboard or the windshield under the effect of the impact.

The airbag inflating thus causes the flap to open, also very rapidly, so that the free edge of said flap is actually stopped by the windshield that it generally hits, thereby causing the opening movement of the flap to cease.

In order to avoid destroying the windshield, provision is made, for example, for the flap to be flexible so as to absorb the energy from the impact so as not to break the windshield. The flap is thus less thick than the remainder of the dashboard, while also being hinged thereto.

In that context, the edge of the flap can be secured to the edge of the opening in the dashboard by an additional strip of plastics material injected into the thickness of the flap and into the thickness of the dashboard body. However, when the strip is injected hot, it is too flexible, and when it is injected cold, it is too fragile.

The hinge can thus be formed by a textile mesh overmolded on the inside face of the flap and on the inside face of the dashboard, but in practice the cohesion between the textile mesh and the inside faces is not sufficient in view of the magnitude of the forces involved during opening.

The hinge can also be in the form of a metal flap-reinforcement, a portion of which is fastened to the dashboard body. But there too, the bond between the metal reinforcement and the dashboard body is not sufficiently strong, and, in any event, the resulting assembly is of excessive weight.

OBJECT OF THE INVENTION

An object of the invention is to propose a solution for remedying the above drawbacks.

SUMMARY OF THE INVENTION

To this end, the invention provides a motor vehicle dashboard body provided with an opening closed by a flap, both the opening and the flap being defined by an outline that is generally rectangular, the flap being suitable for opening so as to allow an airbag to be deployed, said motor vehicle dashboard body being characterized in that it is further provided with one or more linear ties fastened to one face of the dashboard body and to one face of the flap, in such manner that segments of linear ties straddle a portion of the outline that extends transversely relative to the vehicle on which the dashboard is to be mounted, in order to constitute or reinforce a hinge via which the flap is hinged to the dashboard body.

The linear ties are thus secured locally to the flap and to the dashboard body, thereby making it possible to procure improved control over the way they are fastened. In addition, said ties can be distributed optimally with regard to the distribution of the forces during opening of the flap. As a result, the hinge constituted in this way is stronger, while its manufacturing cost is lower.

The invention also provides a dashboard body as defined above, provided with fastening tabs overmolded on the linear ties, the linear ties being fastened to the body of the dashboard and/or to the flap via said tabs.

The fastening tabs make it possible to secure each linear tie to the dashboard body and to the flap, this fastening being achieved, for example, by ultrasound welding of plastics materials.

The invention also provides a dashboard body as defined above, provided with at least one fastening tab overmolded over at least two linear ties.

The total number of fastening tabs can thus be reduced significantly in such manner as to limit the production cost.

The invention also provides a dashboard body as defined above, provided with at least one linear tie fastened to the dashboard body or to the flap by means of two tabs overmolded on said linear tie, said two tabs being mutually superposed and fastened to each other, one of said tabs being fastened to the dashboard body or to the flap.

Superposing a plurality of tabs makes it possible to improve further the cohesion between the linear ties and the dashboard body and/or the flap.

The invention also provides a dashboard body as defined above, provided with at least one linear tie arranged in a generally annular configuration.

The invention also provides a dashboard body as defined above, provided with a linear tie having a segment that straddles a lateral portion of the outline, said lateral portion extending longitudinally relative to the vehicle on which the dashboard is to be mounted, said linear tie segment being slack at the lateral portion of the outline that it straddles so as to constitute a retaining linear tie limiting the amplitude of opening of the flap.

By means of the retaining ties, it is possible to ensure that the flap does not hit the windshield during opening, thereby procuring greater freedom as regards the material and the mechanical structure of the flap per se.

The invention also provides a dashboard body as defined above, provided with two segments of retaining linear ties, both of which segments straddle the same lateral portion of the outline, and wherein the two linear ties cross over each other.

By means of the crossed-over linear ties, the area through which the airbag can be deployed is increased laterally, thereby enabling the flap to be deployed better laterally. In addition, the two lateral retaining ties are thus of substantially the same length, thereby simplifying their dimensioning in terms of breaking strength.

The invention also provides a dashboard body as defined above, provided with a single linear tie arranged so as to include firstly a plurality of segments that all straddle a transverse portion of the outline, and secondly a plurality of segments that all straddle a lateral portion of the outline.

The invention also provides a dashboard body as defined above, wherein each linear tie is fastened to the back face of the flap while being engaged in a trough provided for this purpose, and wherein said trough is covered by a plate having one or more ribs extending perpendicularly to the linear tie.

The invention also provides a dashboard body as defined above, provided within the range two tie segments to six tie segments for constituting or reinforcing a hinge via which the flap is hinged to the dashboard body.

BRIEF DESCRIPTION OF THE FIGURES

FIG. 5 is a back view of a third embodiment of the invention, in which embodiment four linear ties are fastened to the back face of the flap and to the back face of the dashboard body via overmolded tabs so as to constitute both the hinge of the flap and means for retaining said flap;

FIG. 6 shows a variant of the third embodiment of the invention, in which embodiment the hinge is made up of four linear ties instead of two;

FIG. 7 is a back view of a fourth embodiment of the invention, in which embodiment a single linear tie is fastened directly to the back face of the flap and to the back face of the dashboard body so as to constitute both the hinge of the flap and the means for retaining said flap; and FIG. 8 is a local section view of the flap in the fourth embodiment of the invention, showing a reinforcement structure for preventing the flap from being torn by the linear tie during opening of the flap.

DETAILED DESCRIPTION OF THE INVENTION

Figure 1:
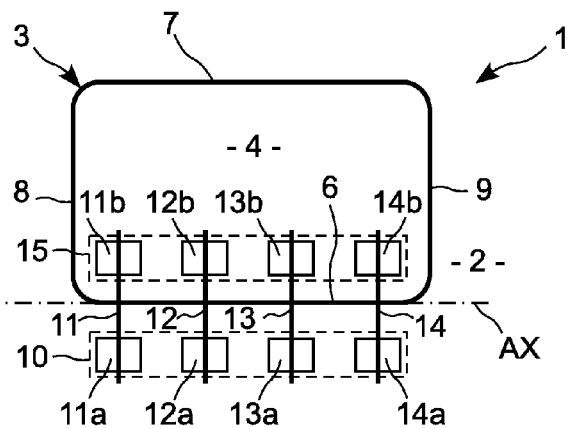
FIG. 1 is a back view of a first embodiment of the invention, including a plurality of distinct linear ties that are perpendicular to the hinge and that are fastened to the flap and to the dashboard via tabs overmolded at their ends.

In FIG. 1, a dashboard designated by the overall reference 1 has a dashboard body 2, the back face of which is provided with an opening defined by a generally rectangular outline 3 and through which an airbag (not shown) can pass, which opening is closed by a flap referenced 4.

This back face corresponds to the inside face of the dashboard body, i.e. to the face that faces towards the ground and towards the front of the vehicle, as opposed to its outside or front face that faces upwards and towards the occupants of the vehicle.

The rectangular outline 3 has two portions 6 and 7, corresponding to opposite sides that extend transversely relative to the direction of advance of the vehicle on which the dashboard 1 is to be mounted. It has two other portions 8 and 9, corresponding to its other opposite sides that extend longitudinally relative to the direction of advance of the vehicle.

The flap 4 is designed to open when the airbag (not shown) is deployed, by pivoting about a transverse axis AX coinciding with the transverse portion 6 of the outline 3.

To this end, the portions 7, 8, and 9 of the outline 3 that correspond respectively to the free edge of the flap 4 and to its lateral edges, are scored cutouts or full cutouts passing through some or all of the thickness of the dashboard. The portion 6 coinciding with the hinge axis AX about which the flap pivots may also be in the form of a scored cutout, of a cutout, or else of a reduction in thickness of the body of the dashboard.

The flap may thus either be a part that is completely distinct from the remainder of the body of the dashboard or, conversely, it may be made integrally of the same material as the remainder of the dashboard body. In which case, the flap is merely defined by the outline and optionally has a thickness that is less than the thickness of the remainder of the dashboard body in such manner as to have greater flexibility.

The cutouts or scored cutouts constituting the rectangular outline may be obtained using cutting tools or other tools, but they may also result entirely or partially from the operation of molding the dashboard body.

In accordance with the invention, the hinge via which the flap 4 is hinged to the remainder of the dashboard body 4 about the axis AX comprises a set of linear ties, referenced 11 to 14, which ties are fastened to the back face and/or front face of the dashboard body 2, and to the back face and/or front face of the flap 4, and pass across or straddle the transverse outline portion 6 that coincides with the axis AX.

These four linear ties 11 to 14 are uniformly distributed along the rectilinear portion 6 of the outline 3 while extending perpendicularly to said rectilinear portion in a manner such as to straddle it.

As shown in FIG. 1, each linear tie 11 to 14 has two tabs overmolded at respective ones of its ends, and via which it is fastened firstly to the body of the dashboard 2 and secondly to the flap 4. The tabs overmolded at the ends of the linear ties that are fastened to the body of the dashboard are referenced 11a to 14a, while the tabs corresponding to the ends of the linear ties that are fastened to the flap 4 are referenced 11b to 14b.

Each of the tabs 11a to 14b and 11b to 14b has a generally flat and rectangular-block shape. They constitute fastening plates that are made of a material of the plastics type that can be fastened securely to the body of the dashboard 2 and to the flap 4, e.g. by vibration or ultrasound welding, by adhesive bonding, or by some other technique.

Alternatively, the square and individual tabs 11a-14a may be in the form of a single rectangular tab 10 shown in dashed lines in FIG. 1, and that is molded over the first ends of the ties 11-14. In analogous manner, the tabs 11b-14b may also be constituted by a single rectangular tab 15 molded over the second ends of the ties 11-14.

When the flap is opened, the pressing forces exerted by the airbag on the back face of the flap 4 cause said flap to be opened, possibly by tearing the portions 7 to 9 of the outline 3 when said outline is a scored cutout.

While such opening is taking place, the linear ties 11 to 14 reinforce the strength of the hinge AX in such manner as to ensure that the flap 4 is not disunited from the remainder of the dashboard body 2. During such opening, the faster the airbag inflates the higher the forces are to which the linear ties 11 to 14 are subjected.

Figure 2:
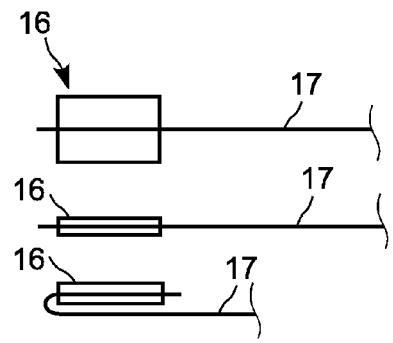
FIG. 2 is a side view of an example of a tab overmolded at one end of a linear tie for fastening it to the flap or to the body of the dashboard.
Figure 3:
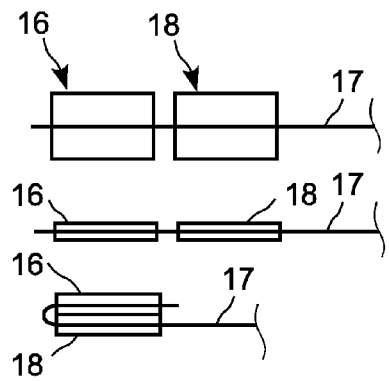
FIG. 3 is a side view of another example in which two tabs are overmolded at the same end of a linear tie for fastening it to the flap or to the dashboard body by means of said two tabs folded over on each other.

In order to ensure that there is no risk of the forces to which the linear ties 11 to 14 are subjected causing the ties to slip in the tabs 11a, 14a and 11b-14b, and thereby resulting in the ends of said linear ties being disunited during opening, particular arrangements may be provided for said tabs, as shown in FIGS. 2 and 3.

When a single tab 16 is overmolded at the end of a linear tie 17, said tab 16 firstly has a face fastened directly to a face of the dashboard body or to a face of the flap, and the linear tie 17 is then folded over onto the free face in such manner as to obtain a wedging effect opposing slippage of the tie inside the tab. Additionally, the tie 17 may also be fastened to the outside face of the tab, as shown in FIG. 2.

The robustness of the fastening of the linear tie 17 is thus increased because the fastening of the linear tie 17 to the tab 16 that is itself secured to its support is achieved firstly by the tab 16 being overmolded on the linear tie, and secondly by the linear tie being fastened to the free face of said tab 16. The linear tie 17 thus extends through the thickness of the tab 16, while also being fastened to the free face 19 thereof.

Additionally, another tab 18 may also be overmolded on the same linear tie 17, while being spaced apart to a small extent from the tab 16 along said tie, as shown in FIG. 3. In which case, during assembly, the first tab 16 is folded over and fastened to a face of the second tab 18, and the other face of the tab is then fastened directly to a face of the dashboard body or to a face of the flap.

The tabs are fastened to the back face of the flap and to the back face of the dashboard body by vibration or ultrasound welding, or by any other method adapted to plastics materials and used for such tabs, for the flap and for the dashboard body.

Figure 4:
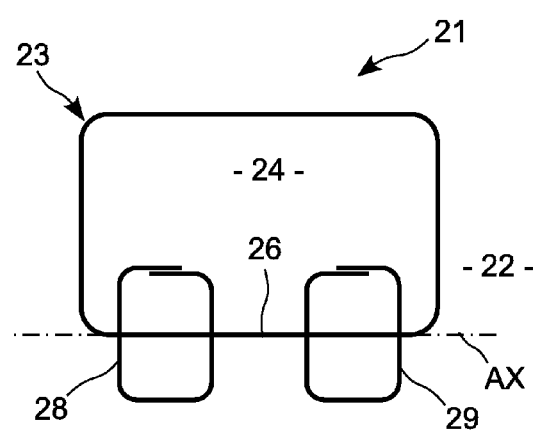
FIG. 4 is a back view of a second embodiment of the invention, in which embodiment two linear ties are mounted directly on the back face of the flap and on the back face of the dashboard body in generally annular configurations.

Alternatively, and as a function of the materials used, the linear ties may be fastened directly to the back faces of the flap and of the dashboard body, as shown in the example of FIG. 4, in which the flap referenced 24 is defined by an outline 23 having its transverse portion 26 coinciding with the hinge axis AX about which said flap pivots in order to open.

Two linear ties 28 and 29 arranged in generally annular, and in this example rectangular, configurations, and straddling the portion 26, are then fastened directly to the back face of the dashboard body 22, and to the back face of the flap 24 in a manner such as to extend on either side of the portion 26 in order to reinforce the bonding at the hinge AX.

The linear ties that are fastened to the back face of the dashboard body and to the back face of the flap have segments straddling the transverse edge that coincides with the pivot axis AX of the flap. But these linear ties may also extend beyond this region so as to straddle the lateral portions of said outline, in such manner as also to constitute retaining means for restricting opening of the flap, as in the examples shown in FIGS. 5 to 8.

In the example shown in FIG. 5, as in the preceding examples, the dashboard 31 has a body 32 provided with an outline 33 defining an opening closed by a flap 34. In this example too, the outline 33 is generally rectangular and has two opposite transverse portions 36 and 38, one of which, namely the portion 36 coincides with the pivot axis AX of the flap, and two lateral other portions 38 and 39 extending longitudinally relative to the vehicle on which the dashboard is to be mounted.

In this embodiment, each one of two linear ties 41 and 42 has a segment 43, 44 straddling the portion 36 of the outline 33 so as to be fastened on either side of this outline portion. The linear tie 41 is fastened via two tabs 41a and 41b overmolded on said linear tie and that are themselves fastened to the flap 34 and to the dashboard body 32.

In analogous manner, the linear tie 42 is fastened to the dashboard body and to the flap respectively via a tab 42a and via another tab 42b, both of which are overmolded on said tie.

Additionally, each linear tie 41, 42 extends beyond the tab 41b, 42b fastened to the flap so as to reach the dashboard body 32 again by straddling a corresponding lateral portion 38, 39 of the outline 33. Each of these two linear ties 41, 42 thus has a segment 46, 47 straddling a corresponding portion 38, 39 of the outline 33, and each of said two linear ties is fastened to the dashboard 32 via an additional tab 41c, 42c.

The segment 46, 47 straddling the corresponding lateral portion 38, 39 of the outline is thus fastened on either side of the outline, firstly via the tabs 41b fastened to the flap and secondly via the tabs 41c and 42c fastened to the dashboard.

Two other linear ties 48 and 49 extend from the flap to the body of the dashboard, each of which has a segment 51, 52 straddling a respective one of the lateral portions 38 and 39 and fastened on either side of the corresponding one said lateral portion 38, 39 via overmolded tabs bearing respective ones of the references 48b, 48c, 49b, and 49c.

As shown in the figures, the tabs 41b, 48b, 41c, 48c are disposed in the corners of a square, and the linear ties 41 and 48 on which said tabs are overmolded interconnect said tabs along the diagonals of said square, so that the segments 46 and 51 of said linear ties cross over each other. In analogous manner, the tabs 42b, 49b, 42c, 49c are also disposed in the corners of a square and they are interconnected via the linear ties 42 and 48 disposed on the diagonals of this square in such manner as to cross over at their segments 42 and 57.

The segments of the linear ties that straddle the lateral portions of the outline are slack, so as to enable the flap to move, and, in addition, they are of length adjusted to limit the extent to which the flap can open in order to prevent it from being able to hit the windshield.

The crossed-over configuration of the linear ties for retaining the flap makes it possible to retain the flap without unnecessarily reducing the area through which the airbag passes in order to deploy. In other words, when the flap is opened, since the retaining linear ties situated on the sides of the flap are in a crossed-over configuration, said ties do not constitute an obstacle to deployment of the airbag in the lateral directions.

As shown in the variant in FIG. 6, the additional linear ties 48 and 49 may also extend to the dashboard body so that each of them has a segment 53, 54 straddling the transverse portion 36 of the outline 33 coinciding with the axis AX.

In this variant, the four linear ties 41 & 42, and 48 & 49 firstly define four segments situated at the hinge AX that they stiffen, and secondly define two crossed-over segments for each lateral edge of the flap, which segments are designed to restrict the opening movement of said flap.

In another embodiment that is shown in FIG. 7, a single linear tie fastened directly to the back face of the flap and to the back face of the dashboard body is arranged in such manner that it includes four segments straddling the portion of the outline of the flap that coincides with the pivot axis thereof, and that each of the two lateral portions of the outline is straddled by two segments crossing over each other and forming retaining linear ties.

In the embodiment shown in FIG. 7, as in the preceding examples, the dashboard 61 has a body 62 provided with an opening defined by an outline 63 and closed by a flap 64. In this embodiment too, the outline 63 is generally rectangular and has two opposite transverse portions 66 and 67, one of which, namely the portion 66, coincides with the pivot axis AX of the flap, and two other lateral portions 68 and 69 that extend longitudinally relative to the vehicle on which the dashboard is to be mounted.

The linear tie that is referenced 70 is disposed at the transverse portion 66 in a series of undulations so as to have four segments 71 to 74 straddling the transverse portion 66 of the outline 63. Additionally, it is disposed at the lateral portion 68 in such manner as to define two segments 76 and 77 crossing over each other and straddling said lateral portion 68, and it is disposed at the other lateral portion 63 in two other segments 78 and 79 crossing over each other and straddling said other lateral portion 69.

In order to improve the cohesion of the linear tie with the flap 64 and/or with the dashboard body, the flap 64 may be provided with a reinforcement 82 at its back face, which reinforcement is provided with a trough 81. In which case, as shown in FIG. 8, the linear tie 70 is engaged in the trough 81 to which it can be fastened by ultrasound welding or by some other technique. Additionally, the reinforcement may be provided with external ribs 83 extending perpendicularly to the direction of the tie so as to avoid the reinforcement being torn by the linear tie under the effect of the pressure exerted by the airbag while it is being deployed.

In the various embodiments of the invention, the linear ties used may advantageously have a round or oval section and contain polyaramide and/or polyester fiber, thereby allowing similar operation at all temperatures, in terms of resistance to mechanical stresses.

Each tie advantageously has breaking strength greater than 150 decanewtons (daN), or indeed greater than 300 daN, and preferably greater than 500 daN. The breaking elongation is less than 25%, or indeed less than 15%, and preferably less than 10%.

Each tie advantageously has breaking strength greater than 150 daN, and advantageously greater than 500 daN, or indeed greater than 300 daN. The elongation at 300 daN is less than 25%, and is preferably equal to 10%, or indeed 15%.

In the examples shown in the figures, the linear ties are fastened to the back face of the dashboard body and to the back face of the flap, but they may also be fastened to the front face, by being concealed by foam and by the skin constituting the outer covering of the dashboard.

The invention claimed is:

1. A motor vehicle dashboard body provided with an opening closed by a flap, both the opening and the flap being defined by an outline that is generally rectangular, the flap being suitable for opening so as to allow an airbag to be deployed, wherein said motor vehicle dashboard body is further provided with one or more linear ties fastened to one face of the dashboard body and to one face of the flap, in such manner that a segment of the one or more linear ties straddles a portion of the outline that extends transversely relative to the vehicle on which the dashboard is to be mounted, in order to constitute or reinforce a hinge via which the flap is hinged to the dashboard body, and wherein another segment of the one or more linear ties straddles a lateral portion of the outline, said lateral portion extending longitudinally relative to the vehicle on which the dashboard is to be mounted, said another segment being slack at the lateral portion of the outline that it straddles so as to constitute a retaining linear tie limiting the amplitude of opening of the flap.

2. A dashboard body according to claim 1, provided with fastening tabs overmolded on the linear ties, the linear ties being fastened to the body of the dashboard and/or to the flap via said tabs.

3. A dashboard body according to claim 2, provided with at least one linear tie fastened to the dashboard body or to the flap by means of two tabs overmolded on said linear tie, said two tabs being mutually superposed and fastened to each other, one of said tabs being fastened to the dashboard body or to the flap.

4. A dashboard body according to claim 1, provided with at least one linear tie arranged in a generally annular configuration.

5. A dashboard body according to claim 4, provided with two segments of retaining linear ties, both of which segments straddle the same lateral portion of the outline, and wherein the two linear ties cross over each other.

6. A dashboard body according to claim 4, provided with a single linear tie arranged so as to include firstly a plurality of segments that all straddle a transverse portion of the outline, and secondly a plurality of segments that all straddle a lateral portion of the outline.

7. A dashboard body according to claim 1, wherein each linear tie is fastened to the back face of the flap while being engaged in a trough provided for this purpose, and wherein said trough is covered by a plate having one or more ribs extending perpendicularly to the linear tie.

8. A dashboard body according to claim 1, provided within the range two tie segments to six tie segments for constituting or reinforcing a hinge via which the flap is hinged to the dashboard body.

9. A motor vehicle dashboard body provided with an opening closed by a flap, both the opening and the flap being defined by an outline that is generally rectangular, the flap being suitable for opening so as to allow an airbag to be deployed,
  wherein said motor vehicle dashboard body is further provided with one or more linear ties fastened to one face of the dashboard body and to one face of the flap, in such manner that a segment of the one or more linear ties straddles a portion of the outline that extends transversely relative to the vehicle on which the dashboard is to be mounted, in order to constitute or reinforce a hinge via which the flap is hinged to the dashboard body, and wherein another segment of the one or more linear ties straddles a lateral portion of the outline, said lateral portion extending longitudinally relative to the vehicle on which the dashboard is to be mounted, said another segment being slack at the lateral portion of the outline that it straddles so as to constitute a retaining linear tie limiting the amplitude of opening of the flap;
  wherein the dashboard body is provided with fastening tabs overmolded on the linear ties, the linear ties being fastened to the body of the dashboard and/or to the flap via said tabs; and
  wherein at least one fastening tab is overmolded over at least two distinct linear ties.

10. A dashboard body according to claim 9, provided with at least one linear tie fastened to the dashboard body or to the flap by means of two tabs overmolded on said linear tie, said two tabs being mutually superposed and fastened to each other,
  one of said tabs being fastened to the dashboard body or to the flap.

11. A dashboard body according to claim 9, provided with at least one linear tie arranged in a generally annular configuration.

12. A dashboard body according to claim 9, provided with two segments of retaining linear ties, both of which segments straddle the same lateral portion of the outline, and wherein the two linear ties cross over each other.

13. A dashboard body according to claim 9, provided with a single linear tie arranged so as to include firstly a plurality of segments that all straddle a transverse portion of the outline, and secondly a plurality of segments that all straddle a lateral portion of the outline.

14. A dashboard body according to claim 9, wherein each linear tie is fastened to the back face of the flap while being engaged in a trough provided for this purpose, and wherein said trough is covered by a plate having one or more ribs extending perpendicularly to the linear tie.

15. A dashboard body according to claim 9, provided within the range two tie segments to six tie segments for constituting or reinforcing a hinge via which the flap is hinged to the dashboard body.

* * * * *